Feb. 7, 1928. 1,658,295
A. MOORHOUSE
CARRIER
Filed April 18, 1922
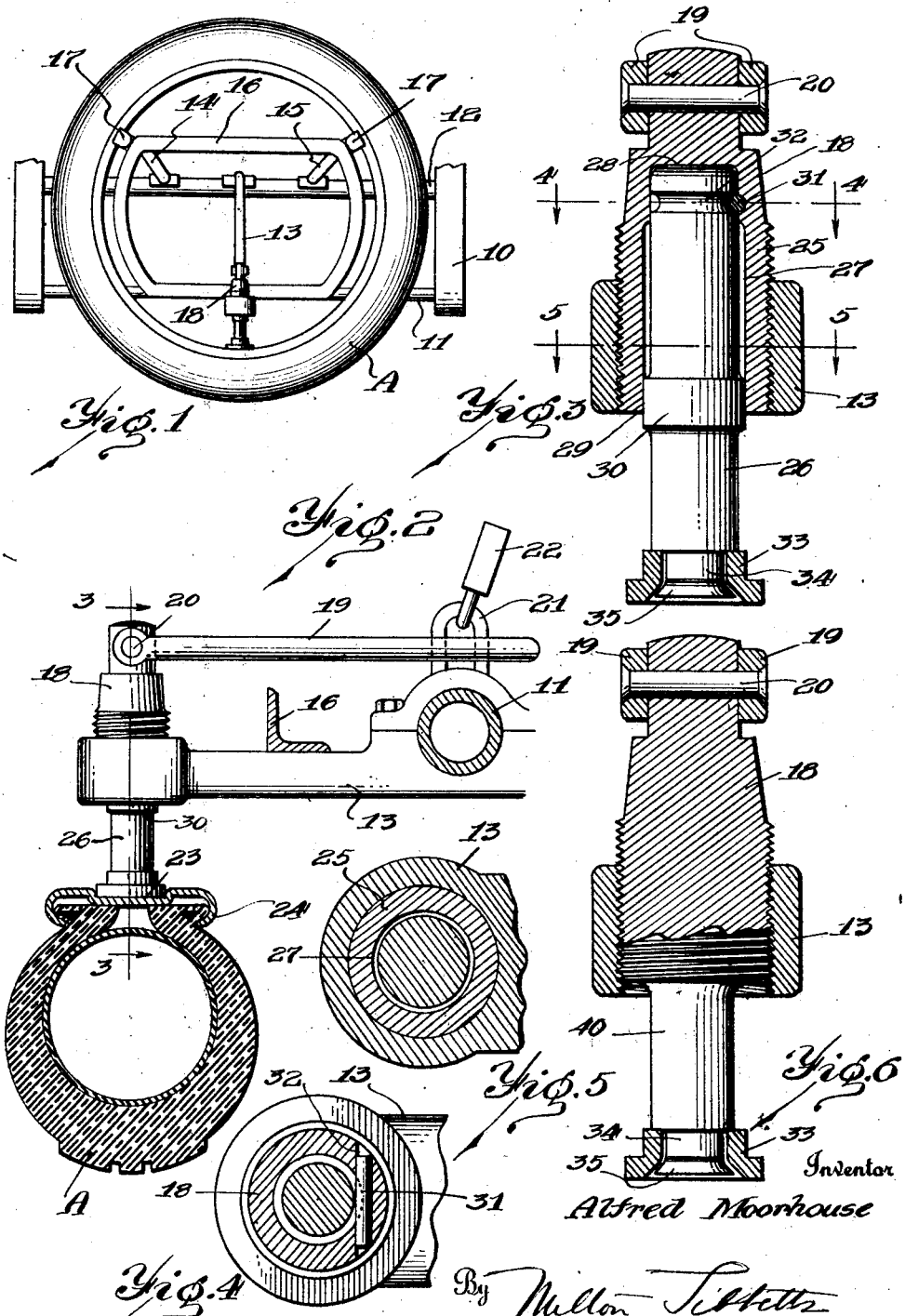
Inventor
Alfred Moorhouse
By Milton Tibbetts
Attorney Patented Feb. 7, 1928.

1,658,295

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

CARRIER.

Application filed April 18, 1922. Serial No. 555,083.

This invention relates to carriers and particularly to tire carriers.

In carriers for spare tires there is one type in which the support has several radial lugs and a radial clamping device whereby the spare tire is supported by the carrier from the inside of the rim upon which the tire is mounted, the tire and rim being usually referred to as a spare tire. One of the difficulties that has been encountered with this type of carrier is in connection with the clamping member which is usually a threaded bolt extending radially and having its end in contact with a groove interiorly of the tire rim. With such a carrier mounted on the rear of a vehicle the tire is in an exposed position and is frequently bumped by another vehicle when one or the other is getting into or out of a parking place at the curb. Because of the extension of the clamping bolt below the support in which it is threaded this bumping of the tire frequently bends the bolt and makes it impossible to withdraw it from the support. It is sometimes possible to bend the bolt back substantially straight and it can then be removed but frequently it has to be sawed off in order to remove it from the support. Of course this is considerable of an aggravation, to say nothing of expense, particularly if it is not discovered that the bolt is bent until the spare tire is required in an emergency.

The present invention has for one of its objects the remedying of the above defect in this type of tire carrier and at the same time it provides for some give in the clamping means in case of a very unusual bump and yet allowing for the ready unclamping of the device.

Another object of the invention is to provide a tire carrier with a clamping bolt that may bend without injuring the threaded part of the bolt.

Another object of the invention is to provide a clamping bolt which shall have its threaded part wholly above the lower face of the support so that only an unthreaded part of the bolt can bend in case of a severe bump against the spare tire held by the bolt.

Another object of the invention is to provide a tire carrier with a clamping bolt in which there is a threaded part which remains wholly within the support and a swiveled clamping bolt which extends beyond the support and which will take all of the bending stresses without injuring the threaded part.

Other objects of the invention will appear from the following description taken in connection with the drawings, which form a part of this specification, and in which:

Fig. 1 is a rear elevation of a motor vehicle frame with a tire carrier thereon embodying the invention;

Fig. 2 is an enlarged side view of a portion of the tire carrier shown in Fig. 1 with parts in section and with a spare tire in place;

Fig. 3 is a further enlarged longitudinal sectional view substantially on the line 3—3 of Fig. 2;

Figs. 4 and 5 are transverse sections on the lines 4—4 and 5—5 respectively of Fig. 3; and Fig. 6 is a view similar to Fig. 3 showing another form of clamping bolt made in accordance with the invention.

Referring to the drawings 10 represents the two side members of a motor vehicle frame and 11 and 12 are two of the cross bars connecting the side members of the frame.

The supporting part of the tire carrier of this invention is of well known form and comprises three separate arms, 13, 14 and 15 secured together in spaced relation by a ring or hoop 16, the latter being usually of angle iron section as shown particularly in Fig. 2. The arms 13, 14 and 15 are secured in any desired manner to the cross bars 11 and 12, as shown particularly in Figs. 1 and 2, and the arms 14 and 15 are provided with radially extending lugs 17 for receiving the spare tire A or the inner groove of a tire rim upon which a tire is mounted. When a tire is placed on these two lugs 17 as shown in Fig. 1 it may be clamped to the carrier by a clamping bolt 18 threaded through the projecting end of the arm 13 as shown particularly in Figs. 1 and 2. The bolt 18 may be rotated by a lever handle 19 which is pivoted to it as at 20 and this lever arm may be locked in its closed down position by a staple 21 and padlock 22 as shown particularly in Fig. 2.

If the clamping bolt 18 were a single piece and threaded down through the arm 13 in the usual manner so that its lower end entered the groove 23 of the rim 24 of the tire carrier, the lower threaded part of the bolt would be exposed below the arm 13 and any heavy bump against the spare tire A would bend the bolt and prevent it from being unscrewed from the arm. But by the present invention this clamping bolt is so formed that no threaded part of the bolt extends below or beyond the arm 13, that is beyond the clamping side of the arm, when the bolt is in its fully clamped position, so that even if there is an unusual strain on the bolt and it should be bent out of shape it could still be retracted by reason of the fact that all of the threaded part would remain intact because of being housed within the support 13.

In the form shown particularly in Figs. 2, 3, 4 and 5 the clamping bolt 18 is formed in two principal parts, the part 25 and the part 26. The part 25 is threaded into the arm 13 and in its lowest clamping position the lower end of this part does not extend below or at least not materially below the underneath surface of the arm 13, this bolt being shown in its lowest position in Fig. 3. The part 25 is drilled out to form a recess 27 and the part 26 is telescoped in the part 25 and is swiveled therein so that the parts may turn independently of each other. Preferably the part 26 of this bolt extends to the entire depth of the recess 27 and is substantially the same circumference as the recess near both ends of the recess but is smaller intermediate the ends. This gives a bearing surface for the part 26 at its inner end as at 28 and another bearing surface near the outer end of the recess as at 29, the enlargement 30 of the bolt part 26 providing for this contact near the outer end of the recess.

The bolt part 26 is retained in the recess by a cross pin 31 and an annular groove 32 which is formed in the bolt part 26 near its inner end. There is a loose fit between the pin 31 and the groove 32 so that the bolt will bear against the inner wall of the recess 27 and not on the pin 31, the latter being for the purpose of withdrawing the bolt 26 when unclamping.

The lower end of the bolt 26 may or may not have a swiveled shoe 33 mounted thereon. If such shoe is used the lower end of the bolt 26 is turned down smaller as shown at 34 and after the shoe 33 is put on over the part 34 the lower end thereof is riveted over as at 35. This provides a double swivel between the part 25 of the bolt 18 and the tire rim groove 23.

From the above description it will be seen that a spare tire A may be placed on the lugs 17 of the tire carrier and the bolt 18 may then be screwed down by using the handle 19, so that the clamping part 26 of the bolt 18 will enter the groove 23 of the spare tire and thus clamp the tire to the carrier at three points. The parts are so designed that the bolt 26 can be made of fairly good steel so that it will withstand all ordinary shocks against the spare tire but should a particularly severe shock be received by the tire the bolt 26 would bend somewhat and thus relieve the rear end of the vehicle frame of some of the shock and yet the tire could still be unclamped because the bent bolt 26 would not in the least interfere with the unscrewing of the part 25 of the clamping bolt. The clamping bolt could then be taken out entirely and the part 26 could either be bent back into shape or replaced. Since there are no threads on the part 26 it could be bent back into shape much more easily than a threaded bolt.

In Fig. 6 the bolt 18 is shown in one main piece with a swiveled shoe 33, however, at its lower end similar to the shoe 33 of the form shown in Fig. 3. The bolt is shown in its extreme lower or clamping position and its threaded portion is so formed that it does not extend below the arm or support 13 when in that position. Below the threaded part the bolt 18 is somewhat contracted as at 40 so that if a strain sufficient to bend the bolt is received this lower part 40 will be bent and none of the threaded portion will be in any way injured.

It will be understood that various forms of the invention other than those described above may be used without departing from the spirit or scope of the invention.

Having thus described my invention, what I claim and desire to secure by Letters Patent is:

1. In a tire carrier or similar device, the combination with a support, of a member threaded into said support and having a part extending beyond said support into contact with the tire rim, substantially the entire part of said member extending beyond said support, when the member is in full clamping position, being smaller than the threaded part of said member, whereby said member when subjected to stress is adapted to be strained only at said extending part.

2. In a tire carrier, the combination with a supporting arm, of a clamping member threaded through an opening in the arm and normally projecting therefrom, the entire projecting part of said member being smaller than the opening in said arm, said member being adapted to bend first at said projecting portion, whereby injury to the threaded portion thereof is avoided.

3. In a tire carrier, the combination with a supporting arm, of a clamping member threaded through an opening in the arm and having an unthreaded part extending beyond the arm, substantially all of said unthreaded part being materially smaller than the threaded part, said unthreaded part instead of the threaded part being adapted to bend under unusual stress on the tire or bolt.

4. In a tire carrier, the combination with a support, of a clamping member threaded therein and having a smaller unthreaded portion beyond the support and adapted to bend before the threaded part will bend, whereby said clamping member may be readily removed from said support after having been severely deformed.

5. In a tire carrier, the combination with a support, of a clamping member threaded therein and comprising a threaded part and a clamping bolt swiveled to the threaded part, said bolt being adapted to bend before the threaded part will bend.

6. In a tire carrier, the combination with a support, of a clamping member comprising an outer part threaded into the support and having a recess, and an inner part extending into the recess and being out of contact with the walls of said recess except adjacent the inner and outer ends of said recess.

In testimony whereof I affix my signature.

ALFRED MOORHOUSE.